Figure 1:
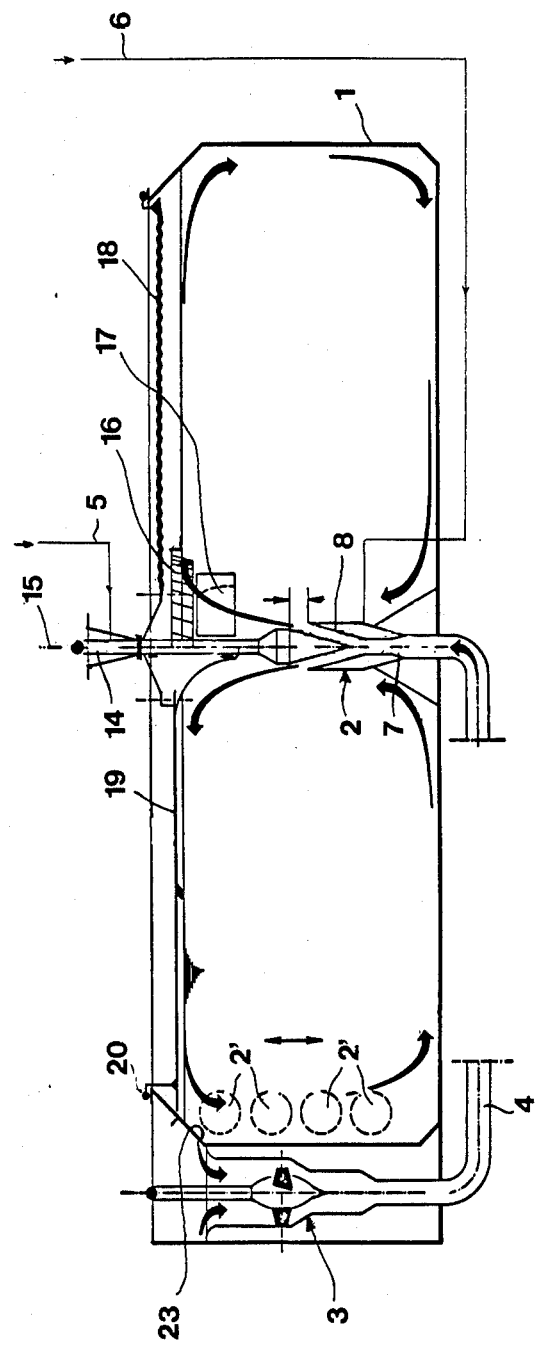

United States Patent [19]

Kaelin

[11] Patent Number: 4,704,204
[45] Date of Patent: Nov. 3, 1987

[54] INSTALLATION FOR INJECTING OXYGEN INTO LIQUID MEDIA

[76] Inventor: Joseph R. Kaelin, Beckenriedstrasse 58, CH-6374 Buochs, Switzerland

[21] Appl. No.: 858,557

[22] Filed: Apr. 24, 1986

Related U.S. Application Data

[63] Continuation of Ser. No. 618,829, Jun. 8, 1984, abandoned.

[30] Foreign Application Priority Data

Jun. 10, 1983 [CH] Switzerland .................. 3201/83

[51] Int. Cl.$^4$ .................................................. C02F 3/20
[52] U.S. Cl. .................................. 210/219; 210/220; 261/84; 261/124; 261/DIG. 71
[58] Field of Search ............... 210/624, 758, 219, 220; 261/84, 87, 124, DIG. 71, DIG. 70

[56] References Cited

U.S. PATENT DOCUMENTS

| | | | |
|---|---|---|---|
| 3,965,009 | 6/1976 | Kaelin | 210/220 X |
| 3,979,294 | 9/1976 | Kaelin | 210/220 X |
| 4,021,349 | 5/1977 | Kaelin | 210/220 X |
| 4,235,720 | 11/1980 | Nakajima et al. | 210/220 |
| 4,242,289 | 12/1980 | Blum | 210/220 X |
| 4,282,172 | 8/1981 | McKnight | 210/220 X |
| 4,305,894 | 12/1981 | Lindblom | 210/220 X |

Primary Examiner—Tom Wyse
Attorney, Agent, or Firm—Eric P. Schellin

[57] ABSTRACT

In order to inject oxygen into a liquid, for example, sewage, the installation is provided with an aerating system (2) that is arranged in an aerating basin (1).

In order to improve the oxygen injection rate per kilowatt of driving force the aerating system (2) that is connected with a pump (3) in the manner of a water jet pump, the flow cross-section of which, in its air intake area, can be varied so as to change the oxygen injection rate. To this end, the diffusor stage (8) of the aeration system (2) extends along a conical surface. The hollow-configured conical diffusor inner portion (13) is arranged, together with a surface aeration impellor (16), on a common drive shaft (14), and can be moved along its longitudinal axis (15). The diffusor inner portion and the diffusor outer portion (13, 12, respectively) each have a plurality of air injection nozzles that are oriented towards the interior of the diffusor (8) so as to inject oxygen into the sewage that is accelerated and formed into vortices in the diffusor (8).

10 Claims, 5 Drawing Figures

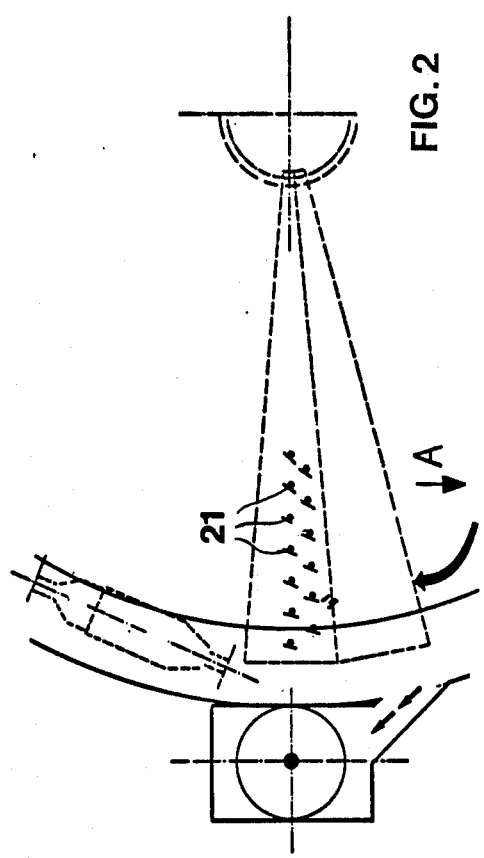
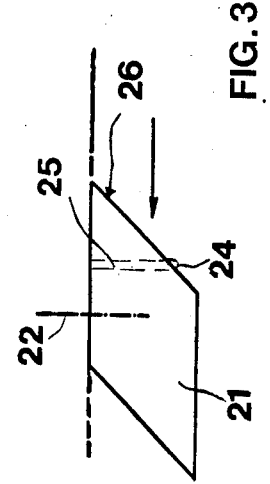

INSTALLATION FOR INJECTING OXYGEN INTO LIQUID MEDIA

This application is a continuation of application Ser. No. 618,829, filed June 8, 1984, now abandoned.

The present invention relates to an installation for injecting oxygen into liquid media with at least one aerating device arranged in an aerating basin, said aeration device being used to inject oxygen or gas that contains oxygen into the liquid in this basin, as well as the use of such an installation.

The sewage treatment plants familiar up to now entail the disadvantage that a great deal of motive force is needed in order to inject oxygen or a gas containing oxygen into the sewage contained in the aerating basins.

It is the task of the present invention to create an installation in which a great deal less power is needed for each cubic meter of oxygen that is injected into the liquid contained in the aerating basin than is the case in installation familiar up to now.

In an installation of the type described in the introduction hereto this problem is solved in that the aerating system, which is connected to a liquid delivery system, is configured to take in and inject oxygen in the manner of a jet pump, and in that its flow cross-section can be varied in its gas suction area to change the oxygen injection performance.

In order to achieve the fact that the gas bubbles that are injected into the liquid can as far as is possible be prevented from rising through and escaping from the liquid that is to be aerated, it is expedient that the direction of the outflow from the aerating system be towards the bottom of the aerating basin.

In order to achieve good oxygen-injection performance, it is expedient that the diffusor portion of the aerating system pass along a conical surface line, and the conical diffusor inner portion can be displaced longways on the common longitudinal axis (15) relative to its associated conical diffusor outer portion (12) to change the flow cross-section of the diffusor. In this connection it is advantageous if the diffusor inner and-/or the diffusor outer portion is/are configured as a hollow body or as hollow bodies, and each have/has a plurality of gas injection nozzles that are oriented towards the interior of the diffusor. In order to achieve intensive vortex formation in the liquid within the diffusor of the aerating system it is also expedient if the diffusor inner portion is arranged so as to be rotatable about its longitudinal axis and the gas inlet nozzles that protrude from it are on their outsides configured at least approximately as paddles such that the diffusor inner portion is made to rotate by the liquid flowing through the diffusor.

It is also possible that the diffusor portion of the aerating system has at least two flow deflector walls that can pivot relative to each other, of which at least one can pivot about a pivot axis that extends on the diffusor inlet side, and at least one of these flow deflector walls is provided with gas inlet nozzles that extend into the diffusor, through which, as a result of the partial vacuum that is generated in the diffusor during operation of the installation, the oxygen or the gas containing oxygen is injected into the diffusor.

If the basin is suitably configured, it can also be advantageous if the direction of outflow from the aerating system is directed upwards towards the intake opening of a surface aerating impeller and preferably a flow directing apparatus be arranged ahead of the intake opening of this impeller.

If the aerating basin is of circular plan, it can be expedient, with a view to increasing the water circulation in the basin, if at least a portion of the surface of the liquid contained in the aerating basin be covered by a circular or arc-shaped cover, in which connection the latter being installed so as to be rotatable about the vertical centre axis of the basin, its lower surface being provided with delivery paddles that extend downwards into the liquid that is to be aerated, in which connection the latter are preferably adjustable about their vertical longitudinal axes and configured such that the liquid to be aerated, contained in the aerating basin, is moved at least in its surface areas about the vertical centre axis of the basin against the outer edge of the basin. In this connection it is advantageous if the cover has injector nozzles for injecting oxygen or gas that contains oxygen into the liquid that is to be aerated, said nozzles extending into the liquid that is to be aerated, and preferably being integrated in the delivery paddles. In order to prevent coarse materials and fibres from getting hung up on the delivery paddles that are connected to the cover, when the installation is in operation, it is also expedient that the paddle entry edges extend obliquely downwards and forwards in the direction of flow of the layer of water that is moved through them during operation.

It has also been found to be advantageous if the liquid delivery system is configured as a propeller pump with rotatable paddles, this being driven, preferably hydraulically, together with a surface aeration impellor.

Figure 4:
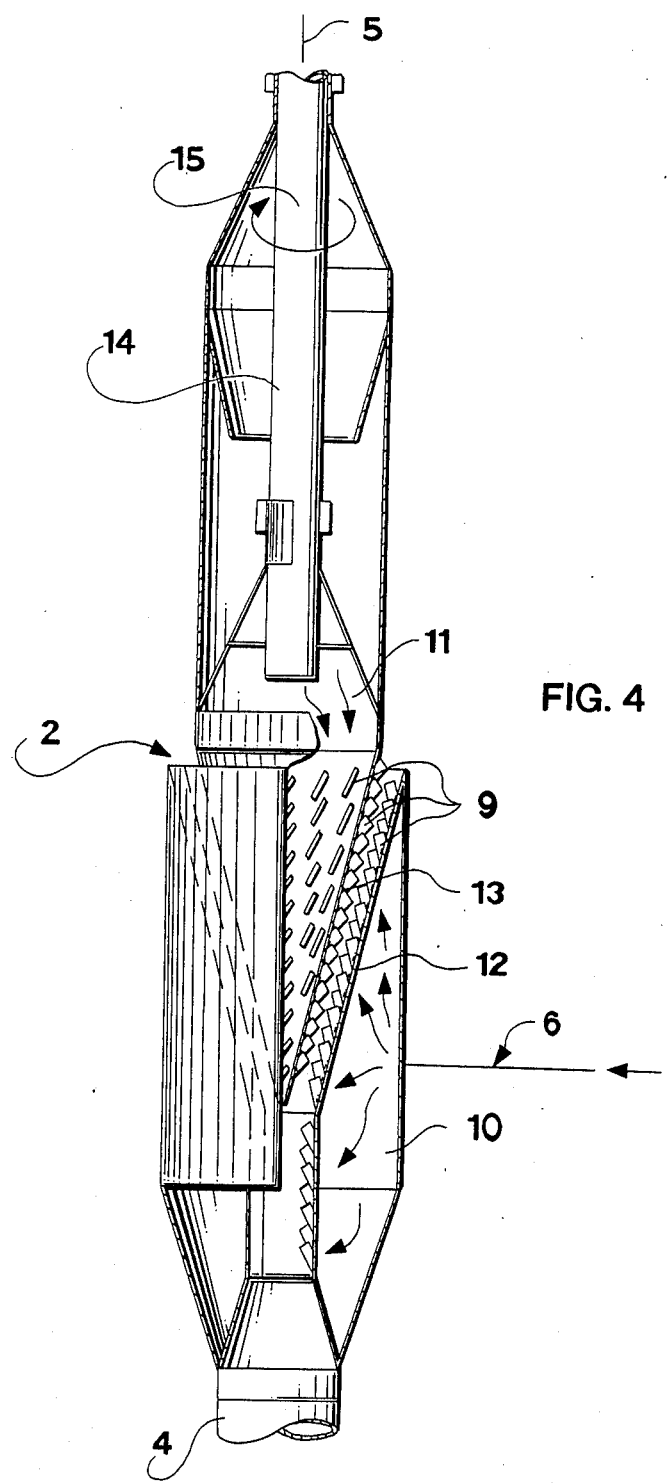
Figure 5:
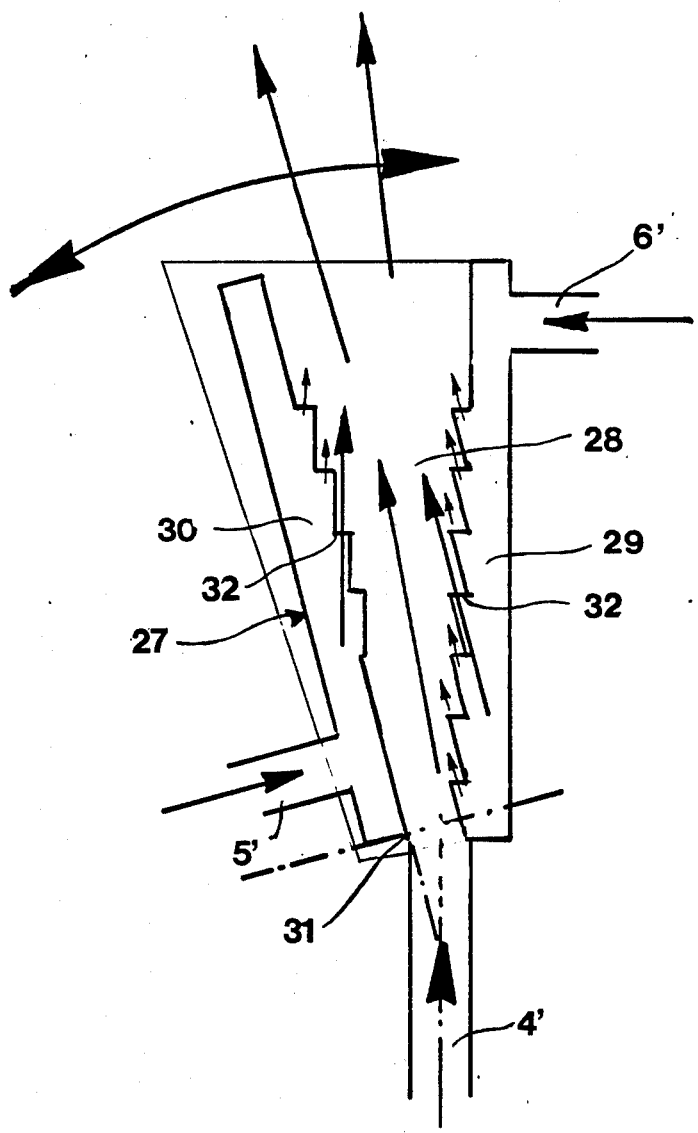

The present invention is described on the basis of the drawings appended hereto; these drawings are as follows:

FIG. 1: a cross-section through an exemplary version of an installation according to the present invention;

FIG. 2: a plan view of a part of the installation shown on the left of FIG. 1;

FIG. 3: a side view, at larger scale, of a delivery paddle secured to the cover as in FIG. 2;

FIG. 4: a partial cross-section, at enlarged scale, of the aerating system shown in FIG. 1;

FIG. 5: a cross-section through a further version of an aerating system

As can be seen FIGS. 1 to 4, the sewage purification plant that is shown in part (for example, the resettling basin is not shown) has an aerating system 2 that is arranged in an aerating basin 1, this being used to inject air into the sewage contained in this basin and which is to be aerated. In this connection, the aerating system 2 that is connected through a pressure line 4 to a sewage delivery system 3 that is configured as a propellor pump, which is used to pick up and inject the air drawn in from the atmosphere through the feed lines 5 and 6 in finely divided form into the sewage contained in the basin 1 in the manner of a water jet pump, in which the sewage, delivered under pressure through the pressure line 4, as can be seen particularly plainly in FIG. 4, first enters a confusor stage 7 where it is sharply accelerated and in particular in the diffusor stage 8 takes in the air through the injector nozzles 9 that protrude into this from the air collector chambers 10 and 11 that are connected to the air feed lines 5 and 6. It is also possible, of course, to connect the feed lines 5 and 6 with the outlet of an air compressor.

As can be seen especially from FIG. 4, the diffusor stage 8 of the aerating system 2 extends along a conical surface, and the diffusor inner portion 13 and the diffusor outer portion 12 are configired as hollow chambers to form the air collector chambers 10, 11, respectively, and over the whole of their surfaces that define the diffusor stage are provided with a plurality of injector nozzles 9.

In order to change the flow cross-section of the diffusor, which is to say to change the oxygen injection rate of the aerating system 2 the conical diffusor inner portion can be moved relative to its associated conical diffusor outer portion 13 along the common axis 15 by means of an adjuster motor through a shaft 14 that can be rotated about its longitudinal axis 15.

The injector nozzles 9 that protrude from the rotatably mounted diffusor inner portion 13 into the diffusor 8 are approximately paddle shaped on their outer sides and are set such that the diffusor inner portion 13 is made to rotate by the sewage that flows through the diffusor 8 at high speed. This results in an extraordinarily strong vortex formation of the sewage-air mixture in the diffusor 8.

In the right-hand part of FIG. 1 it is shown how the direction of outflow of the aerating system 3 is directed upwards against the suction opening of a surface aerating impellor 16, in which connection, in order to increase the delivery efficiency of the latter a fixed flow guide apparatus is arranged ahead of the suction opening of this impellor 16.

In order to avoid the emission of water fog and noise, the basin 1 is provided with a cover on its top.

As is indicated in the left-hand half of FIG. 1, it is also possible to arrange one or a plurality of similarly configured aerating systems 2' in addition to the centrally arranged aerating system 2, or to provide these in place of the centrally arranged aerating system 2, in which connection the outflow direction of the aerating systems 2' that are arranged at the sides is directed slightly downwards towards the bottom of the basin in order to generate a toroidal circulation flow in the basin 1.

As can be seen from the left-hand half of FIG. 1, it is also possible that, in place of (or in addition to) the surface aeration impellor 16, at least a part of the surface of the sewage contained in the aerating basin 1 can be covered by a circular or arc-shaped cover 19. This cover 19 is mounted so as to be rotatable about the vertical basin centre axis 15, and is installed so that it can rotate on the basin 1 on rollers 20 that are installed around its periphery. The cover 19 is driven by a drive shaft 14.

On its lower surface, the cover 19 is provided with delivery paddles 21 that extend downwards into the sewage that is to be aerated; these paddles are arranged so as to be adjustable about their vertical longitudinal axes, so as to provide for adjustment of the direction of delivery and their delivery rate; this is done so that when the cover 19 is rotated the sewage contained in the aerating basin 1 is moved in its surface areas about the centre axis 15 of the basin against the outer edge 23 of the basin.

In addition, the delivery paddles 21 are provided with air injection nozzles 24 that open out into their low pressure areas. Each of these nozzles is connected by an air feed channel 25 that extends through the associated delivery paddle 21 to the upper side of the cover 19, which is to say to the atmosphere, so that when the cover 19 is rotated they inject air independently into the surface area of the sewage.

In order to prevent coarse materials and fibres contained in the sewage from hanging up on the delivery paddles, the paddle entry edge 26 is configured so as to be inclined downwards and forwards in the direction of flow of the water layer that is moved by it, as can be seen clearly in FIG. 3.

Instead of air, the exhaust gases from combustion plants, internal combustion engines, etc., for example, mixed with air or pure oxygen, can be injected through the feed lines 5 and 6 into the sewage, and there washed.

FIG. 5 shows a second exemplary version of an aerating system 27, in which the diffusor stage 28 has two flow guide walls 29 and 30, these being movable relative to each other and configured as hollow bodies; of these, one is used to change the confusor through-flow cross-section by being mounted, so as to pivot about a pivot axis 31 that extends on the diffusor intake side.

Both flow guide walls 29 and 30 are provided with air injection nozzle 32 that extend into the diffusor 28, through which, as in the version shown in FIG. 4, as a result of the partial vacuum in the diffusor 28 that is generated when the installation is in operation the air that is drawn in through the feed lines 5' and 6' is introduced into the diffusor where it is thoroughly mixed with the sewage that is flowing through.

In order to avoid water that has been introduced through the pressure line 4' into the diffusor from flowing out at the side of the latter the fixed flow guide wall 29, for example, is provided with two limiting walls that delimit the diffusor 28 to the side but which, however, permit displacement of the flow guide wall 30; in FIG. 5, as a result of the cross-section illustration, only one of these, 33, can be seen.

Both flow guide walls 29 and 30 are provided with air injection nozzles 32 that extend into the diffusor 28, through which, as in the version shown in FIG. 4, as a result of the partial vacuum in the diffusor 28 that is generated when the installation is in operation the air that is drawn in through the feed lines 5' and 6' is introduced into the diffusor where it is thoroughly mixed with the sewage that is flowing through.

In order to avoid water that has been introduced through the pressure line 4' into the diffusor from flowing out at the side of the latter the fixed flow guide wall 29, for example, is provided with two limiting walls that delimit the diffusor 28 to the side but which, however, permit displacement of the flow guide wall 30.

I claim:

1. In an installation for injecting oxygen into liquid media, having a least one aeration device that is arranged in an aeration basin for injecting oxygen or gas containing oxygen into a liquid contained in said basin, and wherein said aerating device is connected to a liquid delivery system and configured with a diffusor in the manner of a water-jet pump, the improvement wherein said diffusor extends along a conical surface and has a conical diffusor inner portion which is adjustable along a common longitudinal axis relative to a conical diffusor outer portion to vary the through-flow-cross-section of said diffusor outer portion; said diffusor inner portion s rotatable about said common longitudinal axis relative to the conical diffusor outer portion, and said diffusor inner portion and said diffusor outer portion are configured as hollow bodies having a plurality of gas injection nozzles extending from the interior of said hollow bodies towards the interior of said diffusor.

2. An installation according to claim 1, wherein said gas injection nozzles extending from said diffusor inner portion is paddle-shaped to allow rotation of said inner portion by liquid flowing therethrough.

3. An installation according to claim 1, characterized in that the diffusor inner portion is arranged so as to be able to rotate about its longitudinal axis and the gas injector nozzles that protrude from it are on their outer sides paddle-shaped such that the diffusor inner portion is made to rotate by the liquid flowing through the diffusor.

4. An installation according to claim 1, characterized in that the outflow direction of the aeration device is directed upwards towards the suction opening of a surface aeration impellor, and a flow guide apparatus is installed ahead of the suction opening of this impellor.

5. An installation according to claim 4, characterized in that the diffusor inner portion and the surface aeration impellor are arranged on a common drive shaft and rotated by this.

6. An installation according to claim 1, the aerating basin being of circular plan form, characterized in that at least a part of the surface of the liquid contained in the aerating basin is covered by a circular or arc-shaped cover, said cover is supported so as to be able to rotate about the vertical centre axis of the basin and its lower surface being provided with delivery paddles that extend downwards into the liquid that is to be aerated, in which connection the delivery paddles are configured such that the liquid in the aerating basin is moved at least in its surface area about the vertical centre axis of the basin towards the outer edge of the latter.

7. An installation according to claim 6, characterized in that the cover has injection nozzles that protrude downwards into the liquid that is to be aerated and are integrated with the delivery paddles, for injecting oxygen or gas containing oxygen into the liquid that is to be aerated.

8. An installation according to claim 7, characterized in that the paddle entry edge is inclined forwards in the direction of flow of the water layer that is moved by it during operation.

9. In a sewage treatment plant injecting oxygen or an oxygen containing gas into a sewage contained in an aerating basin, the improvement comprising using an aerating device connected to a liquid delivery system to take in and inject oxygen, which is configured in the manner of a water-jet pump, and characterized by a flow cross-section in the gas intake area which can be varied to change the oxygen injection rate; said aeration device having a conical diffusor inner portion rotatable about its longitudinal axis relative to a conical diffusor outer portion to vary the through-flow-cross-section; said diffusor inner portion and said diffusor outer portion are configured as hollow bodies having a plurality of gas injection nozzles directed towards the interior of said diffusor.

10. In a sewage treatment plant for injecting oxygen into liquid media, having at least one aeration device that is arranged in an aeration basin for injecting oxygen or gas containing oxygen into a liquid contained in said basin, and wherein said aerating device is connected to a liquid delivery system and configured with a diffusor in the manner of a water-jet pump, the improvement wherein said diffusor extends along a conical surface and has a conical diffusor inner portion which is adjustable along a common longitudinal axis relative to a conical diffusor outer portion, and said diffusor inner portion and said diffusor outer portion are configured as hollow bodies having a plurality of gas injection nozzles extending from the interior of said hollow bodies towards the interior of said diffusor; said gas injection nozzles extending from said diffusor inner portion being paddle-shaped to allow rotation of said inner portion by liquid flowing therethrough.

* * * * *